United States Patent [19]
van Reijendam et al.

[11] 4,011,184
[45] Mar. 8, 1977

[54] BITUMEN-POLYMER COMPOSITION

[75] Inventors: Jan W. van Reijendam; Jan van Schooten, both of Amsterdam, Netherlands

[73] Assignee: Shell Oil Company, Houston, Tex.

[22] Filed: Mar. 17, 1975

[21] Appl. No.: 559,095

[30] Foreign Application Priority Data
Mar. 28, 1974 United Kingdom ............ 13746/74

[52] U.S. Cl. .................... 260/28.5 R; 260/23.7 M; 260/42.37; 404/72
[51] Int. Cl.² ........................................ C08L 91/00
[58] Field of Search ................ 260/28.5 R, 23.7 R, 260/23.7 M, 42.29, 42.37, 758, 745, 28; 404/72

[56] References Cited
UNITED STATES PATENTS

| | | | |
|---|---|---|---|
| 3,161,620 | 12/1964 | Perkins | 260/23.7 R |
| 3,303,151 | 2/1967 | Peters | 260/28.5 A |
| 3,585,155 | 6/1971 | Hillstein | 260/28.5 AS |

Primary Examiner—Melvyn I. Marquis
Assistant Examiner—William E. Parker
Attorney, Agent, or Firm—Dean F. Vance

[57] ABSTRACT

A bitumen-polymer composition with improved elastomeric properties is prepared by chemically coupling a modified bitumen and a modified polymer with a metal compound wherein the bitumen and polymer are first modified by attaching to the bitumen and polymer carboxylic acid groups or anhydride groups.

21 Claims, No Drawings

BITUMEN-POLYMER COMPOSITION

BACKGROUND OF THE INVENTION

This invention relates to an improved bitumen composition. More particularly, this invention relates to an improved bitumen-polymer mixture. Specifically, the invention discloses a bitumen-polymer composition which is prepared by chemically coupling a polycarboxylated bitumen-polymer mixture with a metal compound.

THE PRIOR ART

Various mixtures of a bitumen and a polymer have been prepared in the past to either lower the overall cost of the polymeric product or combine the valuable characteristic properties of both the bitumen and the polymer in the resulting product. Thus, for example, bitumens have been used in admixture with copolymers such as styrene-butadiene rubber (SBR) in order to replace part of the costly SBR and to impart favorable hysteresis properties to the SBR. Also, minor proportions of polymers and copolymers have been physically mixed with bitumens to improve the rheological properties of the bitumen, which properties are of particular importance when the bitumen is used as a binder in road-building and various industrial applications. For example, in regions with very high temperatures in summer and very low temperatures in the winter, the bitmens applied in roadbuilding should possess both an adequate resistance to plastic deformation at the high temperatures and an adequate plasticity at the low temperatures.

While the physical mixtures of bitumens and polymers referred to above are advantageous in some applications, the large amount of polymer required to enhance the physical properties of the bitumen mixture makes such a bitumen-polymer mixture too expensive for certain applications. It has now been found that the quantity of polymer needed is reduced and the physical properties of the bitumen-polymer mixture are enhanced when the components of the bitumen-polymer composition are, at least in part, chemical bound to each other via the use of a coupling agent.

SUMMARY OF THE INVENTION

The present invention discloses a bitumen-polymer composition and the method for making the same. The bitumen-polymer composition is prepared by contacting a modified bitumen and a modified polymer in the presence of a metal compound wherein the bitumen and the polymer are first modified by attaching thereto reactive substituent groups selected from carboxylic acid groups and anydride groups.

DETAILED DESCRIPTION OF THE INVENTION

The bitumen-polymer composition is prepared by chemically coupling a modified bitumen and a modified polymer with a metal compound. The modified bitumen and the modified polymer are prepared by attaching to at least a part of both the bitumen and the polymer, reactive substituents selected from carboxylic acid groups and carboxylic acid anhydride groups. The carboxylic acid groups and carboxylic acid anhydride groups, are attached directly or indirectly to the modified bitumen and modified polymer. The term "attached indirectly" means that the groups are bonded to the bitumen or polymer by insertion of a divalent group, such as a methylene, ethylene or phenylene group, which divalent group is optionally substituted with non-reactive substituents.

THE BITUMEN

The bituminous component includes both naturally occurring materials, such as gilsonite, and materials prepared from petroleum fractions. Examples of suitable bitumens include distillation or straight-run bitumens, which typically comprise the residues obtained in the fractional distillation of lower boiling components of a petroleum stream, precipitation bitumens obtained as a residue in solvent (typically propane) extraction of high-boiling petroluem fractions; blown bitumens obtained by the air-blowing of straight-run bitumens and the like; and cracked bitumens, which are obtained as residues from a cracking operation. Cracked bitumens include the pitch by-product of the atmospheric thermal cracking of distillation feedstocks, such as naptha or gas oil. Blends of the above mentioned bitumen with each other and/or with solvents or diluents ("cutbacks") are also employed in the invention. Preferred bitumens are the straight-run and precipitation bitumens. Especially preferred are straight-run bitumens having a penetration of between about 20 and about 500 at 25° C (0.1 mm) according to ASTM D5, for example, those straight-run bitumens having a penetration of between about 50 and 100.

THE MODIFIED BITUMEN

The modified bitumen is prepared by reacting a bitumen with an ethylenically unsaturated carboxylic acid or acid anhydride. Preferably, the modified bitumen is prepared by reacting the bitumen with an ethylenically unsaturated carboxylic acid anhydride. The ethylenically unsaturated carboxylic acid anhydrides used in this invention include, among others, maleic acid anhydride, phthalic anhydride, nadic anhydride and the like, and mixtures thereof. The preferred anhydrides to be used are the ethylenically unsaturated polycarboxylic acid anhydrides containing from 4 to 18 carbon atoms. The ethylenically unsaturated carboxylic acids employed in the invention include aliphatic, cycloaliphatic and aromatic acids and also include mono-carboxylic and poly-carboxylic acids. Preferred among the acids are the dicarboxylic acids. Particularly preferred is maleic anhydride.

The modified bitumens are preferably prepared by acidization, that is, by reaction with ethylenically unsaturated acid or anhydride. This reaction is carried out by known methods, for example by heating the bitumen with the acid or anhydride at a temperature of between about 100° C and about 200° C under stirred conditions. The amount of acids or anhydride added is between about 0.5% and about 10.0% weight based on the weight of the bitumen. Thus only a minor portion of the bitumen need be modified. The groups attached to the modified bitumen are usually present as anhydride groups although some carboxylic acid groups are also present. The amount of carboxylic acid groups in the modified bitumen is increased by adding water to the product or by contacting the modified bitumen with atmospheric water vapor.

THE POLYMER

The polymer to be employed in the invention is an elastomer having a molecular weight of from about 100,000 to about 500,000. Examples of suitable elastomeric polymers include natural rubber, styrene-butadiene rubber, block copolymers such as styrene-butadiene-styrene, isoprene rubber, butyl rubber, butadiene rubber, nitrile rubber, polyurethane rubber, ethene-propene rubbers (EPDM) such as terpolymers with dicyclopentadiene, and mixtures thereof. Graft polymers are also suitable. A preferred polymer is styrene-butadiene rubber having a molar ratio of styrene to butadiene of about 1:6 and a molecular weight of from about 100,000 to about 500,000.

THE MODIFIED POLYMER

The modified polymer to be employed has free anhydride or carboxyl groups. The modified polymer, in one modification is prepared in a similar manner as the modified bitumen. The amount of anhydride or acid added is from about 0.5% to about 10.0% weight based on the weight of the unmodified polymer. However, other methods are also employed to modify the polymer. For example, the polymerization of conjugated dienes, such as butadiene, by means of an alkyllithium initiator, leads to a polydiene with terminal lithium atoms, and, on subsequent carboxylation, to the corresponding dicarboxylic acid. Another suitable method involves the copolymerization of a suitable monomer with an unsaturated carboxylic acid or ester, e.g. acrylic acid or an ester thereof, or with an unsaturated cyclic carboxylic anhydride, such as maleic anhydride, followed, if required, by hydrolysis. The introduction of carboxyl groups is accomplished, moreover, by reaction with a mercaptocarboxylic acid, such as mercaptoacetic acid.

THE COMPOSITION PRIOR TO CHEMICAL COUPLING

The aforesaid modified bitumen and modified polymer are mixed to provide a composition to be chemically coupled. However, the preferred method for preparing this modified bitumen and modified polymer composition comprises mixing an unmodified bitumen with an unmodified polymer and reacting the mixture with an acid or anhydride, preferably with maleic anhydride. Suitable reaction temperature are from about 100° to about 200° C. The amount of acid or anhydride used is suitably from 0.5% to 10% weight based on weight of unmodified bitumen and unmodified polymer.

The proportion of carboxyl groups and/or anhydride groups in the compositions comprising the modified bitumen and the modified polymer varies but preferably corresponds to an acid value, determined by titration, of from about 0.01 to about 2 meq/g, more preferable from about 0.1 about 0.5 meq/g, and most preferably to about 0.35 meq/g. Compositions having acid values within these ranges are very suitable to be used as such in the coupling process which is discussed hereinafter. However, compositions having higher acid values are employed, although such compositions are preferably diluted with unmodified bitumen or other diluents before they are used in the coupling process.

The weight ratio of modified bitumen to modified polymer is from about 80:20 to about 99.9:0.1, preferably from about 90:10 to about 99.9:0.1. An especially preferred weight ratio of modified bitumen to modified polymer is from about 95:5 to about 99:1.

For some applications it is preferred that prior to coupling, a cationic emulsifying agent be added to the modified bitumen-modified polymer composition to form a cationic emulsion in water. Examples of suitable emulsifying agents include "DINORAM"-S and "STABIRAM"-EM. Preferably, mineral acids, such as hydrochloric acid, are also present in the emulsion. Suitable aqueous emulsions comprise from about 100% to about 300% weight modified bitumen-modified polymer, from about 0.1% to about 3.0% weight cationic emulsifier and from about 0.05% to about 2.0% weight mineral acid, all percentages being based on weight of water.

THE CHEMICAL COUPLING

The modified bitumen-modified polymer mixture prepared as above is then contacted with a metal compound capable of forming carboxylic acid salts with the reactive substituent groups of the mixture. The carboxylic acid groups are either already present in the composition to which the metal compound is added or are formed in situ, e.g. by hydrolysis of an anhydride group. Without desiring to be bound to any particular theory, it is likely that this chemical coupling involves ionic aggregates, or clusters, comparable with the ionic micelles found in certain metal soaps when dispersed in non-polar media.

THE METAL IONS

The metal ion present in the coupled products is an ion of any of a great variety of metals. Suitable metals are iron, chromium, manganese and those of Groups I to IV of the Periodic Table, found in Organic Chemistry by Morrison & Boyd, 1959, especially those of the Sub-Groups IA to IVA, e.g. lithium, sodium, potassium, calcium, magnesium, barium, aluminum and lead. Preferred ions are those of lithium, sodium, potassium, calcium, magnesium, barium, aluminum, iron, chromium and manganese. The valence of the metal ion concerned has, as a rule, an effect on the thermoelastic properties of the resulting material. Thus, the temperature at which the elasticity disappears on heating is appreciably higher when metal ions with a higher valence are used, as compared with those of a lower valence. This temperature is, for example, 130° C for $Na^+$, and is higher than 175° C for $Al^{3+}$. On subsequent cooling, the original elasticity is restored. The thermal reversibility of the ionic coupling products is a valuable property for many applications.

In the case of coupled products prepared from non-emulsified compositions it is preferred that simple metal compounds be used in the process. Suitable are compounds of the aforesaid metals, such as the oxides, hydroxides, alkoxides, metal salts of relatively weak acids, in general those acids having a pK greater than about 4.2 at 25° C, e.g., acetates, or metal alkoxides. Examples of suitable coupling agents are the hydroxides of lithium, sodium, potassium and barium, lead(II-)acetate, magnesium acetate, aluminum isopropoxide and aluminum sec-butoxide. Mixtures of two or more coupling agents are employed if desired. Preferably, the coupling agent employed should be in aqueous solution or in the liquid state under the reaction conditions, as is the case for example with aluminum isopropoxide, or sec-butoxide.

These coupling reactions are generally carried out by heating the modified bitumen-modified polymer mixture together with the coupling agent at a temperature of from about 100° to about 200° C, preferably from about 160° C to about 190° C, until the by products formed, such as water, have been removed, at least substantially, by evaporation. As the reaction progresses, the reaction mixture becomes increasingly viscous and rubberlike. It is therefore advisable, as a rule, to adapt the temperature to the viscosity, e.g., by starting at about 120° C and raising the temperature to about 175° C during the reaction. The amount of coupling agent applied is usually from about 25% to about 500 %w of that needed stoichiometrically for neutralization of the carboxylic acid moieties. Amounts of from about 50% to about 300 %w, particularly from about 75% to 200 %w of the theoretical amount, are preferred, however.

When preparing the chemically coupled bitumen-polymer composition, it is often desirable to use the starting material — i.e. a mixture of modified bitumen and modified polymer — in the form of a cationic emulsion in water as described above. Such emulsions are often coupled by the metal ions present in complex metal compounds such as mineral aggregates and/or mineral fillers often employed in conjunction with bitumens.

Examples of suitable mineral aggregates are gravel, granite, gritstone, basalt, porphyry, dolomite, slags, calcined bauxite and limestone whereas limestone is also an example of a particularly suitable filler. In general, aggregates are described as particles which do not pass through a 75 micron sieve whereas fillers are particles which do pass through a 75 micron sieve. The aggregates and fillers are those which, upon contact with the aforesaid emulsions are leached of metal ions in sufficient amounts to form the appropriate ionic structures. The metal ions leached depend upon the chemical nature of the aggregate and/or filler but are suitably any metal ions with those of potassium, sodium, calcium, magnesium, iron, chromium and manganese being particularly effective. One manner in which to judge the suitability of the aggregate and/or filler is to place about 10 grams to about 150 grams of aggregate or filler in 100 grams of demineralized water, and measure the pH. Solutions having a pH of at least 7, preferably of at least 8 or 9, indicate suitable aggregate or filler. The aggregate and/or filler are often used as the sole metal compound providing the metal ions, but may be used in combination with one or more simple metal compounds as described above.

One suitable method of coupling with aggregate is to spray the cationic aqueous emulsion as prepared above onto a road surface and then apply a surface dressing of aggregate. Another method is to premix the aggregate and the cationic aqueous emulsion and apply the resulting mixture to the road surface. In general, aqueous cationic emulsion and fillers are premixed before being used.

The chemically coupled bitumen-polymer composition may be mixed with other substances such as fillers, stones and the like. This composition is then employed in paving roads, hydraulic engineering and erosion control, roofing, flooring, briquetting and protection of pipes against corrosion.

Modified bitumen-modified polymer compositions without chemical coupling have adequate rheological properties. However, when the modified bitumen-modified polymer mixture is chemically coupled according to the invention, the mixture has greater viscosity and hardness, and in particular, increased elasticity, tensile strength and elongation at break as compared with the corresponding non-chemically coupled, physical mixture of bitumen and polymer.

The coupled products possess excellent compatibility with unmodified bitumen in which they appear to dissolve completely to give a homogeneous system. The products moreover, adhere very well to glass and concrete.

Although some of the desirable properties mentioned above are encountered in certain physical mixtures of unmodified bitumen and polymers, a much higher proportion of the valuable polymer component is invariably needed in these cases in order to achieve comparable effects. Coupled products according to the invention are, therefore, very advantageous also from an economic point of view.

The invention is further illustrated by means of the following Illustrative Embodiments and Comparative Examples. Note that the embodiments and examples are given for the purpose of illustration only and that the invention is not to be regarded as limited to any of the specific conditions or reactants recited therein.

In the following Illustrative Embodiments and Comparative Examples, penetration refers to the penetration at 25° C (0.1 mm) according to ASTM D5, the softening point to the Ring and Ball softening point (°C) according to ASTM D36 and the viscosity to the viscosity at 150° C (poise) measured with a Haake Rotovisko viscosimeter, using the plate and cone arrangement, data obtained at a shear rate of $4625^{-1}$.

The following bitumens are referred to by number in the embodiments and comparative examples:
1. Lagunillar bitumen (ASTM penetration 80–100);
2. Kuwait bitumen (ASTM penetration 300);
3. Kuwait semi-blown bitumen (ASTM penetration 80–100);
4. Kuwait bitumen (ASTM penetration 200);
5. Kuwait bitumen (ASTM penetration 300);
6. Kuwait fully-blown bitumen (ASTM penetration 25, ASTM softening point 85);
7. Bitumen obtained by mixing 5 parts per bitumen weight (pbw) of Iranian heavy short residue (ASTM penetration 500–600) with 1 pbw of Iranian light propane bitumen (the mixture had an ASTM penetration of 300). Bitumens (1) and (2) are straight-run bitumens.

The following elastomers are referred to by number in the embodiments and comparative examples:
e1. An oil-extended styrene-butadiene rubber, molecular weight 400,000, bound styrene 25% weight, oil 37.5 phr;
e2. a styrene-butadiene rubber, molecular weight 200,000, bound styrene 23% weight, as a 13.5% weight solution in toluene.

ILLUSTRATIVE EMBODIMENTS 1 to 6

In Illustrative Embodiments 1 to 6, various non-chemically coupled, modified bitumen-modified polymer mixtures were prepared.

A portion of elastomer (e1), cut into pieces of about 0.5 to 1.0 grams (g), or the solution of elastomer (e2), was added in one portion, with stirring, to the bitumen having a temperature of about 160° C, in a widenecked round-bottomed flask. Dispersion of the elastomer was effected by continual stirring for about 2 hours at this temperature.

The resulting bitumen-elastomer mixture, or a part thereof, was then heated to 175° C, maleic anhydride (MA) added and the mixture kept at 170°–180° C for 2 hours with continual stirring, the mouth of the reaction flask having been covered with aluminum foil.

The acid values of the products were determined by titration. The types of starting materials, the amounts used and the acid values are given in Table I.

Some properties of some of the uncoupled products are given in Table III at the end of Illustrative Embodiment 13.

with 200 g of maleic anhydride (2 %w based on elastomer-bitumen) for 2 hours at 175° C, with stirring by a paddle mixer.

The acid value of the maleinized product thus obtained, determined by titration, was 0.28 meq/g.

Some of the properties of the maleinized, uncoupled products are given in Table III.

Table I

| Il- (ustrative Embodiment | Elastomer | Amount of elastomer (g) | Bitumen | Amount of bitumen (g) | %w of elastomer on bitumen | Amount of MA (g) | %w of MA on elastomer/bitumen | Acid value of product meq/g |
|---|---|---|---|---|---|---|---|---|
| 1 | e1 | 13.5 | 1 | 490 | 2.7 | 2.56 | 2.0 | 0.14 |
| 2 | e2 | 52.5 | 1 | 354 | 2.0 | 7.2 | 2.0 | 0.14 |
| 3 | e1 | 13.5 | 1 | 490 | 2.7 | 3.84 | 3.0 | 0.24 |
| 4 | e1 | 13.5 | 2 | 490 | 2.7 | 3.84 | 3.0 | 0.15 |
| 5 | e1 | 26.7 | 2 | 660 | 4.0 | 19.8 | 3.0 | 0.25 |
| 6 | e2 | 52.5 | 3 | 354 | 2.0 | 5.4 | 1.5 | 0.17 |

ILLUSTRATIVE EMBODIMENTS 7 to 12 a. A bitumen-rubber masterbatch was prepared by kneading, with cooling, 2.5 kg of elastomer (e2) on a Meili Z-blade kneading machine, followed by slowly adding 5 kg of bitumen( ) and continuing kneading with cooling until a homogeneous mass was obtained.

b. A portion of the masterbatch was cut into pieces of about 5 g and dissolved in various bitumens by stirring with a paddle mixer for 2 hous at 160°–180° C.

c. The solution obtained under (b) was then reacted with maleic anhydride at 175° C with stirring.

The product of Illustrative Embodiment 9 was fluxed with 50 %w of a bright stock furfural extract.

The acid values of the products were determined by titration.

The types of bitumen, the amounts of starting materials used and the acid values are given in Table II.

Some properties of some of the maleinized products are given in Table III at the end of Illustrative Embodiment 13.

Table III

| Illustrative Embodiment No. | Penetration | Softening point | Viscosity at 150° C (poise) |
|---|---|---|---|
| 1 | 59 | 57 | 6.6 |
| 3 | 50 | 62 | 8.0 |
| 6 | 52.5 | 59 | — |
| 7 | 120 | 46 | 3.2 |
| 9 | 98 | 55 | — |
| 11 | 201 | 40 | 2.4 |
| 13 | 203 | 41.5 | — |

ILLUSTRATIVE EMBODIMENT 14

A cationic emulsion of the maleinized product prepared by the process according to Illustrative Embodiment 8 was prepared by mixing 650 g of the product, 2.6 g of "DINORAM-S" emulsifier (an N-alkylpropylene diamine) and 0.9 g of hydrochloric acid with 350 g of water.

ILLUSTRATIVE EMBODIMENT 15

Table II

| Illustrative Embodiment | Amount of masterbatch (g) | Type of bitumen added to masterbatch | Amount of bitumen (g) | % elastomer in prod duct (b), on bitumen | Amount of MA (g) | %w of MA on elastomer/bitumen | Acid value of product meq/g |
|---|---|---|---|---|---|---|---|
| 7 | 60 | 4 | 960 | 2 | 20.4 | 2 | 0.18 |
| 8 | 60 | 5 | 960 | 2 | 10.2 | 1 | 0.14 |
| 9 | 35 | 6 | 530 | 2 | 5.6 | 1 | 0.12 |
| 10 | 150 | 7 | 850 | 5 | 30 | 3 | 0.31 |
| 11 | 60 | 5 | 960 | 2 | 20.4 | 2 | 0.21 |
| 12 | 120 | 7 | 920 | 4 | 20.8 | 2 | 0.20 |

Illustrative Embodiment 13 a. A mixture containing equal amounts of elastomer (e2) and bitumen (1) was prepared by kneading the elastomer on a water-cooled two roll mill, slowly adding the bitumen and kneading until a homogeneous mass was obtained.

b. A 400 g portion of this mixture was cut into pieces of about 5 g each dissolved in 10.2 kg of bitumen (2) by stirring for four hours with a Silverson high shear mixture at 160° C, giving a 2 %w solution of elastomer in bitumen. This solution was reacted A cationic emulsion of maleinized product prepared by the process according to Illustrative Embodiment 8 was prepared by mixing 650 g of the product, 2.6 g of "STABIRAM"-EM emulsifier (a product of Pierrefitte-Auby) and 1.75 g of hydrochloric acid with 350 g of water.

ILLUSTRATIVE EMBODIMENT 16

A cationic emulsion of the maleinized product prepared by the process according to Illustrative Embodiment 8 was prepared by mixing 600 g of the product, 3.0 g of "STABIRAM"-EM emulsifier and 3.0 g of hydrochloric acid with 400 of water.

ILLUSTRATIVE EMBODIMENTS 17 to 25

Coupling with alkali-metal hydroxides

Various maleinized products prepared in the previous embodiments were heated to 120° C and the stoichiometric amounts of alkali-metal hydroxides dissolved in water (e.g. 3 ml) were added with vigorous stirring. Within about 1 minute the viscosities of the mixtures increased and the temperature was then raised to 160°–180° C and maintained at this level for 0.5 to 2 hours to remove the water by evaporation, stirring being continued at a lower rate. After cooling to room temperature, coupled products were obtained having rubber-elastic properties which properties diminished on heating e.g. to a temperature of above 130° C and in the case of illustrative Embodiment 17 virtually disappeared. In all cases these properties returned on cooling.

The type of alkali-metal hydroxide, the amount thereof and some properties of the coupled products are given in Table IV.

Table IV

| Illustrative Embodiment | Maleinized product used (Illustrative Embodiment No.) | Coupling agent | Amount of coupling agent (pbw/100 pbw of product) | Penetration | Softening point | Viscosity at 150° C (poise) |
|---|---|---|---|---|---|---|
| 17 | 1 | NaOH | 0.55 | 40 | 72 | 15 |
| 18 | 2 | NaOH | 0.55 | — | — | — |
| 19 | 3 | NaOH | 0.9 | 47 | 72 | 22 |
| 20 | 9 | NaOH | 0.55 | — | 108 | — |
| 21 | 6 | NaOH | 0.55 | — | 86 | — |
| 22 | 3 | LiOH | 0.8 | 43 | 75 | 25 |
| 23 | 3 | KOH | 1.8 | 40 | 87 | 21 |
| 24 | 6 | KOH | 1.8 | — | 88 | — |
| 25 | 9 | KOH | 1.8 | — | 116 | — |

ILLUSTRATIVE EMBODIMENTS 26 to 28

These embodiments illustrate coupling reactions with alkali-metal compounds and obtaining the coupled products in the form of anionic aqueous emulsions.

Anionic aqueous emulsions of coupled products were prepared from the maleinized products prepared by the processes described in Embodiments 11 and 12. The amounts of components used were:

a. 600 g of the maleinized product of Embodiment 11 and 400 g of water containing 0.2 %w of sodium laurate and 0.5 %w of sodium hydroxide (Illustrative Embodiment 26)

b. 550 g of the maleinized product of Illustrative Embodiment XI and 450 g of water containing 0.5 %w of sodium laurate and 0.3 %w of sodium hydroxide (Illustrative Embodiment 27)

c. 500 g of the maleinized product of Illustrative Embodiment 12 and 500 g of water containing 0.5 %w of sodium oleate and 0.5 %w of sodium hydroxide (Illustrative Embodiment 28).

In all three Illustrative Embodiments a stable emulsion of coupled product was obtained which was highly viscous in the case of Illustrative Embodiment 26 and 27. Coupling of the products was shown when a sample of the coupled product of Illustrative Embodiment 28 was isolated by evaporation. The product was highly rubber-elastic and strong and had similar properties to the coupled products prepared in the previous examples.

ILLUSTRATIVE EMBODIMENTS 29 to 34

Coupling with Ba(OH)$_2$ 8H$_2$O

The coupling was carried out in a manner analogous to that described in Illustrative Embodiment 17, the stoichiometric amount of Ba(OH)$_2$ 8H$_2$O being dispersed in 200 g of the maleinized product at 120° C with vigorous stirring, followed by stirring for 2 hours at 175° C. The barium hydroxide need not be dissolved in water however.

In the case of Illustrative Embodiment 33 the coupled product was transferred to a Z-blade mixer, after heating for 2 hours at 175° C, and kneaded at 175° C for 3 hours.

The rubber-elastic properties of the couples products were similar to the coupled product of Illustrative Embodiment 17, whereas the tensile strength proved to be considerably greater. The rubber-elastic properties disappeared partially on heating to 175° C, but were restored on subsequent cooling. The rubber-elastic properties of the coupled product of Illustrative Embodiment 33 at 175° C exceded these of the other coupled products.

The amount of the coupling agent and some properties of the coupled products are given in Table V.

Table V

| Illustrative Embodiment | Maleinized product used (Illustrative Embodiment No.) | Amount of coupling agent pbw/100 pbw of product | Penetration | Softening Point | Viscosity at 150° C (poise) |
|---|---|---|---|---|---|
| 29 | 1 | 2.2 | 37 | 90 | 30 |
| 30 | 3 | 3.4 | 36 | 104 | 44 |
| 31 | 4 | 2.2 | 165 | 46 | 6.5 |
| 32 | 5 | 4.2 | 118 | 67 | — |
| 33 | 6 | 2.2 | — | 97 | — |
| 34 | 9 | 2.2 | — | 117 | — |

ILLUSTRATIVE EMBODIMENT 35

Coupling with aluminum sec-butoxide.

The coupling reaction was carried out in a manner similar to that described in Illustrative Embodiment 17. In this Illustrative Embodiment, 20 g (1.1 pbw) of Al(O-sec-C$_4$H$_9$)$_3$ (from Schuchardt Company), the stoichiometric amount, was introduced into the maleinized product below the surface at 175° C. Stirring was then continued at 175° C for 1 hour.

The rubber-elastic properties of the resulting coupled product at room temperature were essentially the same as those of the product of Illustrative Embodiment 29.

The coupled product had a penetration of 35, softening point of 73 and a viscosity at 150° C of 11 poise.

The following Illustrative Embodiments 36–38 illustrate the use of aggregate to couple maleinized products.

ILLUSTRATIVE EMBODIMENT 36 a. In Illustrative Embodiment 36, 13 g samples of the cationic emulsion prepared by the process described in Illustrative Embodiment 14 were poured into Petri dishes (diameter 14 cm) and covered with 100 g of gravel having the following properties:

| | |
|---|---|
| Size | 2.0 to 3.4 mm |
| pH | 9.3 (100g/100 g water). |

After successive periods of 1 hour the contents of a Petri dish were rinsed with an aqueous solution containing 0.5 %w of "DINORAM-S" and the aggregate turned over with a spatula to expose any unbroken emulsion under the stones. Further rinses were carried out until clear washings were obtained. The contents of the dish were finally washed with distilled water, followed by acetone, before being dried to constant weight. The percentage of deposited bitumen, based on weight of available bitumen, was then determined. It was found that the aforesaid emulsion resulted in a 100% deposit of bitumen after only 2 hours and that the bitumen has good elastic properties.

b. The experiment was then repeated using a conventional bitumen cationic emulsion having the same continuous phase as the above emulsion. It was found that this emulsion resulted in only a less than 15 %w deposit of bitumen after 2 hours and that the bitumen had poor elastic properties.

ILLUSTRATIVE EMBODIMENT 37 a. Illustrative Embodiment 35 was repeated using 13 g samples of the cationic emulsion prepared by the process described in Illustrative Embodiment 15 and an aqueous solution containing 0.5 %w of "STABIRAM"-EM (a product of Pierrefitte-Auby) as the rinse. A 65 %w deposit of bitumen having good elastic properties was obtained after 5 hours.

b. A conventional cationic emulsion containing the same continuous phase as the above emulsion gave a less than 10 %w deposit of bitumen having poor elastic properties after 5 hours.

ILLUSTRATIVE EMBODIMENT 38

A 100 g sample of the emulsion prepared by the process described in Illustrative Embodiment 16 was mixed with 25 g of limestone filler having a pH in demineralized water (100 g/100 g of water) of 8 to 9 and stirred intermittently by hand until the breaking of the emulsion made hard-stirring impossible; this took about 30 minutes. After one hour the precipitated material was washed with water. The precipitated material was subsequently dried by dissolving it in toluene and distilling off the water azeotropically. After all the water had been removed, the toluene was distilled off in vacuo. The properties of the recovered material are given in Table VI under A. For comparison, the properties of the maleinized bitumen-rubber mixture before emulsification are given under B. Also for comparison, a 60 g portion of the maleinized bitumen-rubber mixture was mixed with 25 g of dry limestone filler at 90° C. The softening point of this mixture is given under C. By comparing these data, it can be seen that mixing the emulsion with limestone filler gives a product with a higher softening point (A) than is caused by the physical presence alone of filler (C). This shows that in the first case a coupling reaction occurs which does not occur when dry limestone filler is mixed with the non-emulsified maleinized bitumen-rubber mixture.

Table VI

| Product No. | Penetration at 250° C (0.1 mm) | Softening point Ring and Ball (° C) |
|---|---|---|
| A | 129 | 49.5 |
| B | 180 | 41.5 |
| C | — | 45 |

COMPARATIVE EXAMPLES 1 AND 2

In comparative example 1, a mixture of 100 pbw of bitumen (2) and 2.7 pbw of elastomer (e1) was prepared having a penetration of 66 and a softening point of 55.

In comparative example 2, a mixture of 100 pbw of bitumen (2) and 5.4 pbw of elastomer (e1) was prepared having a penetration of 71 and a softening point of 54.

We claim as our invention:

1. A process for preparing bituminous products which comprises chemically coupling a modified bitumen and a modified elastomer in the presence of ions of a metal selected from the group consisting of iron, chromium, manganese and a metal of Groups I to IV of the Periodic Table wherein said modified bitumen is a bitumen having carboxyl group substituents and wherein said modified elastomer is an elastomer having carboxyl group substituents.

2. A process according to claim 1 wherein said metal is selected from the group consisting of lithium, sodium, potassium, calcium, mangesium, barium, aluminum, iron, chromium and manganese.

3. A process according to claim 1 wherein said elastomer is selected from the group consisting of natural rubber, styrene-butadiene rubber, styrene-butadiene-styrene block copolymer, isoprene rubber, butyl rubber, butadiene rubber, nitrile rubber, polyurethane rubber, and ethene-propane-dicylopentadiene terpolymer.

4. A process according to claim 3 wherein said elastomer is styrene-butadiene-rubber.

5. A process according to claim 1 wherein the weight ratio of modified bitumen to modified elastomer is from about 80:20 to about 99.9:0.1.

6. A process for preparing bituminous products which comprises:
1. contacting a bitumen with a modifying compound selected from the group consisting of ethylenically unsaturated carboxylic acids and ethylenically unsaturated carboxylic acid anhydrides to form a modified bitumen;
2. contacting an elastomer with a modifying compound selected from the group consisting of ethylenically unsaturated carboxylic acids and ethylenically unsaturated carboxylic acid anhydrides to form a modified elastomer;

3. contacting said modified bitumen and said modified elastomer with water to form a pre-coupled bitumen-elastomer composition wherein at least a portion of the anhydride groups present in the modified bitumen and modified elastomer are converted to carboxyl groups; and
4. chemically coupling said pre-coupled bitumen-elastomer composition with ions of a metal selected from the group consisting of iron, chromium, manganese and a metal of Groups I to IV of the Periodic Table.

7. A process according to claim 6 wherein the weight ratio of modified bitumen to modified elastomer is from about 80:20 to about 99.9:01.

8. A process according to claim 7 wherein said modifying compound is maleic anhydride.

9. A process according to claim 8 wherein the amount of maleic anhydride added to the bitumen is between about 0.5% and about 10.0% weight based on the weight of the bitumen and wherein the amount of maleic anhydride added to the elastomer is between about 0.5% and about 10.0% weight based on the weight of the elastomer.

10. A process according to claim 8 wherein the pre-coupled bitumen-elastomer composition has an acid value of from about 0.01 milliequivalents per gram to about 2.0 milliequivalents per gram.

11. A process according to claim 6 wherein the source of the metal ions are those metal ions leached from mineral aggregate or mineral filler.

12. A process for preparing bituminous products which comprises:
1. contacting a bitumen and an elastomer to form an unmodified bitumen-elastomer composition;
2. contacting said unmodified bitumen-elastomer composition with a modifying compound selected from the group consisting of ethylenically unsaturated carboxylic acids and ethylenically unsaturated carboxylic acid anhydrides to form a modified bitumen-elastomer composition;
3. contacting said modified bitumen-elastomer composition with water to form a pre-coupled bitumen-elastomer composition wherein at least a portion of the anhydride groups present in the modified bitumen-elastomer composition are converted to carboxylic groups; and
4. chemically coupling said pre-coupled bitumen-elastomer composition with ions of a metal selected from the group consisting of iron, chromium, manganese and a metal of Groups I to IV of the Periodic Table.

13. A process according to claim 12 wherein the weight ratio of bitumen to elastomer is from about 80:20 to about 99.9:0.1.

14. A process according to claim 13 wherein said modifying compound is maleic anhydride.

15. A process according to claim 14 wherein the amount of maleic anhydride added to the unmodified bitumen-elastomer composition is between about 0.5% and about 10.0weight based on the combined weight of the bitumen and the elastomer.

16. A process according to claim 14 wherein the pre-coupled bitumen-elastomer composition has an acid value of from about 0.01 milliequivalents per gram to about 2.0 milliequivalents per gram.

17. A process according to claim 12 wherein the source of the metal ions are those metal ions leached from mineral aggregate or mineral filler.

18. A process according to claim 12 wherein a cationic emulsifying agent is added along with said water.

19. The composition prepared according to the process of claim 1.

20. The composition prepared according to the process of claim 6.

21. The composition prepared according to the process of claim 12.

* * * * *